United States Patent
Kitai

(10) Patent No.: US 10,363,618 B2
(45) Date of Patent: Jul. 30, 2019

(54) ANTI-VIBRATION METHOD OF BAND SAW BLADE IN BAND SAW MACHINE AND ANTI-VIBRATION ARRANGEMENT

(71) Applicants: AMADA HOLDINGS CO., LTD., Kanagawa (JP); AMADA MACHINE TOOLS CO., LTD., Kanagawa (JP)

(72) Inventor: Masataka Kitai, Kanagawa (JP)

(73) Assignees: AMADA HOLDINGS CO., LTD., Kanagawa (JP); AMADA MACHINE TOOLS CO., LTD., Kanagawa (JP)

(*) Notice: Subject to any disclaimer, the term of this patent is extended or adjusted under 35 U.S.C. 154(b) by 0 days.

(21) Appl. No.: 15/315,949

(22) PCT Filed: Jun. 8, 2015

(86) PCT No.: PCT/JP2015/066473
§ 371 (c)(1),
(2) Date: Dec. 2, 2016

(87) PCT Pub. No.: WO2015/194412
PCT Pub. Date: Dec. 23, 2015

(65) Prior Publication Data
US 2017/0087651 A1    Mar. 30, 2017

(30) Foreign Application Priority Data

Jun. 19, 2014 (JP) .................. 2014-126145

(51) Int. Cl.
*B23D 55/08* (2006.01)
*B23D 59/04* (2006.01)
(Continued)

(52) U.S. Cl.
CPC ........... *B23D 59/04* (2013.01); *B23D 55/005* (2013.01); *B23D 55/082* (2013.01); *B23Q 11/10* (2013.01); *B27B 13/12* (2013.01); *B27B 13/16* (2013.01)

(58) Field of Classification Search
CPC .... B23D 59/04; B23D 55/082; B23D 55/005; B23Q 11/10; B27B 13/12; B27B 13/16
See application file for complete search history.

(56) References Cited

U.S. PATENT DOCUMENTS 1,908,727 A * 5/1933 Bleam .................. B23D 55/082
29/DIG. 61
2,992,663 A * 7/1961 Hendrickson ........ B23D 55/082
83/171
(Continued)

FOREIGN PATENT DOCUMENTS

| JP | 4-53621 | 2/1992 |
| JP | 8-19916 | 1/1996 |

(Continued)

OTHER PUBLICATIONS

Official Action, along with English-language translation thereof, in JP Appl. No. 2014-126145 dated Sep. 28, 2015.
(Continued)

*Primary Examiner* — Kenneth E Peterson
*Assistant Examiner* — Liang Dong
(74) *Attorney, Agent, or Firm* — Greenblum & Bernstein, P.L.C.

(57) ABSTRACT

An anti-vibration arrangement for a band saw blade in a band saw machine, which is constructed to cut a workpiece by shifting the endless band saw blade running in a circulating manner to a cutting direction, wherein nozzles are provided for injecting high-pressure cutting liquid toward each side face of the body of the band saw blade on the entering-side where the band saw blade enters into a cut (Continued)

groove of the workpiece formed by the band saw blade in the cutting process of the band saw machine.

21 Claims, 5 Drawing Sheets

(51) Int. Cl.
  *B23Q 11/10* (2006.01)
  *B23D 55/00* (2006.01)
  *B27B 13/12* (2006.01)
  *B27B 13/16* (2006.01)

(56) References Cited

U.S. PATENT DOCUMENTS

| | | | | |
|---|---|---|---|---|
| 3,225,801 | A * | 12/1965 | Dunn | B23D 55/082 83/169 |
| 3,479,097 | A * | 11/1969 | McLauchlan | B23D 59/04 384/12 |
| 3,557,848 | A * | 1/1971 | Wright | B27B 13/10 83/168 |
| 4,501,181 | A * | 2/1985 | Yakich | B23D 59/04 83/169 |
| 5,678,466 | A * | 10/1997 | Wahl | B23D 59/02 408/61 |
| 2009/0255390 | A1 * | 10/2009 | Chaffin | A22C 17/0006 83/168 |
| 2011/0126814 | A1 | 6/2011 | Nishino et al. | |
| 2011/0174285 | A1 | 7/2011 | Nishino et al. | |
| 2012/0006312 | A1 * | 1/2012 | Grumbine | B28D 5/0076 125/21 |

FOREIGN PATENT DOCUMENTS

| | | |
|---|---|---|
| JP | 11-104914 | 4/1999 |
| JP | 2000-334653 | 12/2000 |
| TW | M463159 | 10/2013 |
| WO | 2010/032371 | 3/2010 |
| WO | 2010/052827 | 5/2010 |

OTHER PUBLICATIONS

Decision to Grant a Patent, along with English-language translation thereof, in JP Appl. No. 2014-126145 dated Nov. 20, 2015.
International Search Report, along with English-language translation thereof, in PCT/JP2015/066473 dated Aug. 4, 2015.
Written Opinion of the International Searching Authority, along with English-language translation thereof, in PCT/JP2015/066473 dated Aug. 4, 2015.
Office Action issued in China Counterpart Patent Appl. No. 201580032286.4, dated Aug. 24, 2017 , along with an English translation thereof.

* cited by examiner

ANTI-VIBRATION METHOD OF BAND SAW BLADE IN BAND SAW MACHINE AND ANTI-VIBRATION ARRANGEMENT

TECHNICAL FIELD

The present invention relates to an anti-vibration method and an anti-vibration arrangement for restraining the vibration of a band saw blade in the blade thickness direction in a band saw machine.

BACKGROUND

The band saw machine is constructed to cut the workpiece by shifting an endless band saw blade running in a circulating manner in the cutting direction (the direction for cutting deeply into the workpiece). When a chatter vibration of the band saw blade occurs in the blade thickness direction of the band saw blade during the cutting of the workpiece by the band saw machine, it is not possible to carry out an accurate cutting of the workpiece. It also generates noise and vibration, and it aggravates the working environment.

In conventional band saw machines, as a countermeasure, the speed of the band saw blade is variably controlled, the band saw blade having an inequality-pitch tooth is adapted, the band saw blade is changed in accordance with the material of the material being cut, and the other cutting conditions are selected.

However, these conventional methods often caused a decline in productivity.

Another conventional method that is known is that the vibration of a band saw blade in the blade thickness direction is restrained by sandwiching the body of the band saw blade with vibration isolation rollers forced onto the band saw blade (For example, refer to Patent Literature 1)

PRIOR ART DOCUMENT

Patent Literature

Patent Literature 1: Japanese Patent Application Publication Nos. Hei 11-104914

SUMMARY OF THE INVENTION

It is not possible to sufficiently suppress the noise and the vibration which occurs in the band saw blade when the vibration, isolation, rollers are adapted to sandwich the body of the band saw blade. The sandwiching structure for the vibration absorption is also complex.

The present invention is achieved on the above situation, and its purpose is to provide an anti-vibration method and an anti-vibration arrangement for sufficiently restraining vibration of a band saw blade in the blade thickness direction in a band saw machine without the complex sandwiching structure, while maintaining high productivity.

In order to resolve the above-mentioned conventional problems, the present invention is characterized such that in an anti-vibration method in the band saw machine, which is constructed to cut the workpiece by shifting an endless band saw blade running in a circulating manner to a cutting direction, high-pressure liquid is injected toward each side face of the body of the band saw blade upon the entering-side where the band saw blade enters into a cut groove of the workpiece formed by the band saw blade in the cutting process.

Another characteristic of the present invention is that in the anti-vibration method of the band saw blade in the band saw machine, the high-pressure liquid injects toward each side face of the body of the band saw blade at least at the inclination angle in which the high-pressure liquid has a collision pressure component in a direction perpendicular to the side face of the body.

Another character of the present invention is that in the anti-vibration method of the band saw blade in the band saw machine, the high-pressure liquid injects toward each side face of the body of the band saw blade at least at an inclination angle in which the high-pressure liquid has a pressure component in the running direction of the band saw blade.

Another characteristic of the present invention is that in the anti-vibration method of the band saw blade in the band saw machine, the high-pressure liquid injects toward each side face of the body of the band saw blade at an inclination angle in which the high-pressure liquid has collision pressure components in a direction perpendicular to the side face of the body and in the running direction of the band saw blade.

Another characteristic of the present invention is that a high-pressure cutting oil is injected as the high-pressure liquid in the anti-vibration method of the band saw blade in the band saw machine.

Another characteristic of the present invention is that in a band saw machine, which is constructed to cut the workpiece by shifting an endless band saw blade running in a circulating manner to a cutting direction, a anti-vibration arrangement for the band saw blade has nozzles for injecting high-pressure liquid toward each side face of the body of the band saw blade on the entering-side where the band saw blade enters into a cut groove of the workpiece formed by the band saw blade in the cutting process of the band saw machine.

Another characteristic of the present invention is that in the anti-vibration arrangement for the band saw blade of the band saw machine, the nozzles are arranged such that the high-pressure liquid injects toward each side face of the body of the band saw blade at an inclination angle in which the high-pressure liquid has collision pressure components in a direction perpendicular to the side face of the body and along the running direction of the band saw blade.

Another characteristic of the present invention is that in the anti-vibration arrangement for the band saw blade of the band saw machine, blade guides are provided to movably support the band saw blade cutting edge which is oriented to the workpiece at an entering-side and a leaving-side of the cut groove of the workpiece. At the blade guide on the entering side, the nozzles are disposed.

In accordance with the present invention, the high-pressure liquid is injected toward each side face of the body of the band saw blade on the entering-side where the band saw blade enters into the cut groove. Therefore, at the entering-side of the cut groove, it is possible to apply a collision force orthogonally to each side face of the body of the band saw blade. Also, at the inside of the cut groove, it is possible to apply pressure of the high-pressure liquid orthogonally to each side face of the body of the band saw blade by introducing the high pressure liquid to the inside of the cut groove on the cutting process. In addition, at the entering side and the inside of the cut groove, it is possible to apply pressure of the high-pressure liquid orthogonally to each side face of the body of the band saw blade.

Therefore, the forces applied to each side face of the body of the band saw blade suppress vibration of the hand saw blade in a blade thickness direction. This results in maintaining productivity, sufficiently suppressing chatter vibration, securing the quality of the cut section of the product, and preventing vibration noise. These effects are realizable only by arranging means for jetting, at the entering side of the cut groove, the high-pressure liquid toward each side face of the body of the band saw blade. This arrangement involves no complex structure and is achievable at a low cost.

In accordance with the present invention, it is possible to apply collision force of the high-pressure liquid orthogonally toward each side face of the body of the band saw blade at the entering-side of the cut groove. Thus, it is possible to suppress vibration of the band saw blade in the blade thickness direction.

In accordance with the present invention, it is possible to introduce a high pressure liquid into the cut groove in the cutting process. Thus, it is possible to apply the forces of the high-pressure liquid orthogonally to each side face of the body of the band saw blade at the inside of the cut groove, result in suppressing vibration of the band saw blade in the blade thickness direction.

In accordance with the present invention, it is possible to apply collision force of the high-pressure liquid orthogonally toward each side face of the body of the band saw blade at the entering side of the cut groove, and it is possible to apply force of the high-pressure liquid orthogonally to each side face of the body of the band saw blade at the inside of the cut groove. Thus, it is possible to suppress vibration of the band saw blade in the blade thickness direction.

In accordance with the present invention, since the cutting oil is jetted at high pressure as the high pressure liquid, it achieves an improvement in the cutting performance and the suppression of vibration of the band saw blade.

In accordance with the present invention, since the nozzles are arranged at the blade guide on the entering-side for injecting the high-pressure liquid, a simple construction is achieved.

DESCRIPTION OF EMBODIMENTS

Embodiments of the present invention will be explained as follows.

Figure 1:
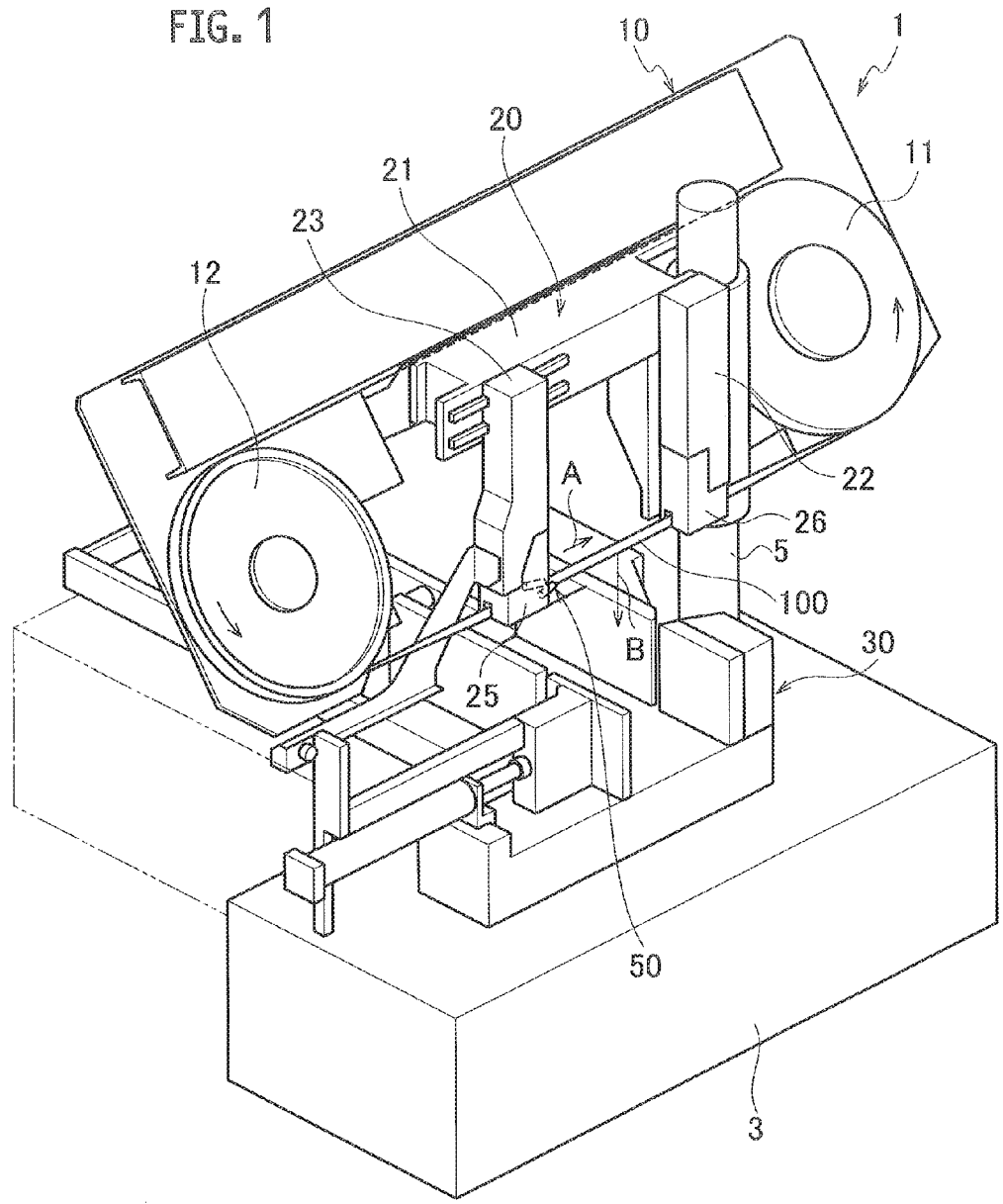
FIG. 1 is a perspective diagram showing a band saw machine according to an embodiment of the present invention.

FIG. 1 is a perspective diagram showing a band saw machine for adapting an anti-vibration method and a anti-vibration arrangement according to an embodiment of the present invention.

The hand saw machine 1 is a horizontal-type band saw machine in which the cutting process of the workpiece W (shown in FIG. 2) is carried out by shifting, to the cutting direction shown by the arrow direction B, an endless band saw blade 100 running in a circulating manner to the arrow direction A. The band saw machine 1 includes a base 3 for supporting the workpiece W, a cutting head 10, which is vertically reciprocated along a guide post 5 standing on the base 3, and a vise mechanism 30 for clamping the workpiece W.

The cutting head 10 has a pair of band saw wheels 11 and 12 that support the endless band saw blade 100 that is wound around the wheels 11 and 12. The band saw wheels 11 and 12 are rotatable and horizontally separated away from each other. One of the band saw wheels is driven to rotate by a driving mechanism (not illustrated) and the other follows it to rotate. To increase tension in the band saw blade 100, the distance between the band saw wheels 11 and 12 is adjustable.

Between the band saw wheels 11 and 12, a blade guide mechanism 20 is arranged in the cutting head 10. The blade guide mechanism 20 supports the band saw blade 100 in a twisted state so that the band saw blade 100 may loop with a cutting edge of a cutting part (a horizontally and linearly-moving lower part) of the band saw blade 100 facing substantially vertically toward the workpiece W (i.e., facing in a perpendicular downward direction). For this, the blade guide mechanism 20 includes a horizontally-extending beam 21 and a pair of blade guides 22 and 23 suspended from the beam 21.

The blade guide 22 from the pair of blade guides 22 and 23 is fixed as a reference side, and the blade guide 23 from the pair of blade guides 22 and 23 is provided movably to the beam 21. At the lower ends of the blade guides 22 and 23, blade inserts 26, 25 are provided respectively for movably-guiding the band saw blade 100.

On the above-mentioned construction, the cutting process of a workpiece W supported on the base 3 with the band saw blade 100 is carried out by shifting the cutting head 10 to the cutting direction in a condition in which the endless band saw blade 100 is running in a circulating manner by driving the band saw wheels 11 and 12.

Hereinafter, the anti-vibration arrangement and the anti-vibration method will be explained by referring to FIGS. 2-6.

Figure 2:
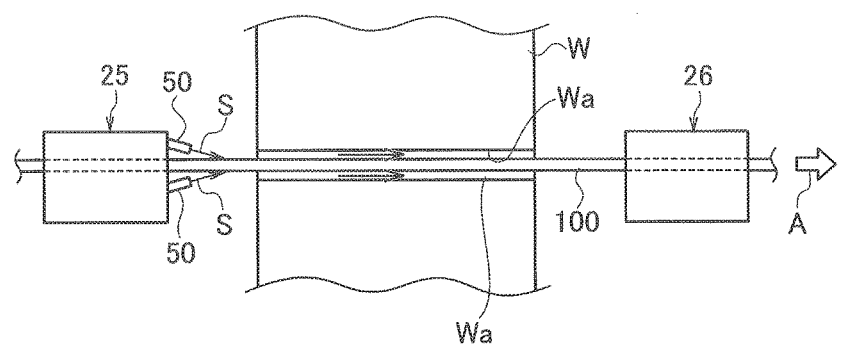
FIG. 2 is a schematic plan diagram showing an anti-vibration arrangement as the main part according to an embodiment of the present invention.
Figure 3:
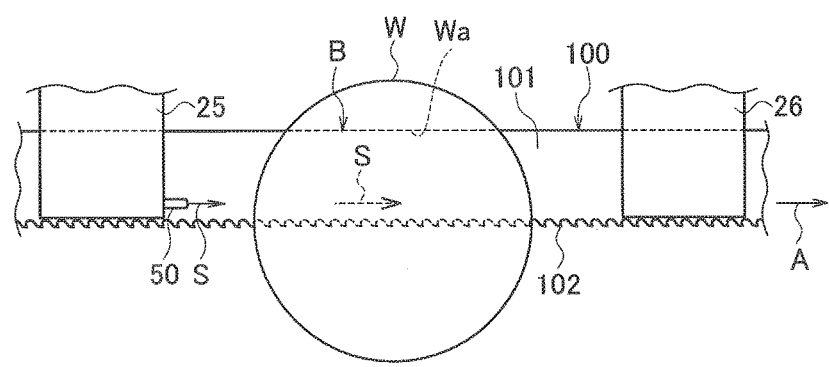
FIG. 3 is a schematic side diagram showing an anti-vibration arrangement as the main part according to an embodiment of the present invention.

An anti-vibration arrangement for the band saw machine 1 includes, as illustrated in FIGS. 2 and 3, a pair of nozzles 50. During the cutting process, the band saw blade 100 forms a cut groove Wa in the workpiece W. On the entering side of the band saw blade 100 into the cut groove Wa (on the upstream side of the workpiece W in the running direction A of the band saw blade 100), the nozzles 50 jet a high-pressure cutting oil S (high-pressure liquid) toward each side of the body 101 of the band saw blade 100.

The high-pressure cutting oil S achieves lubrication and cooling, and is, for example, a coolant. Here, "high pressure" means a pressure (for example, about 1 to 10 Mpa) higher than a normal pressure. According to related arts, the cutting liquid is supplied by pouring it from above an insert. In this case, the pressure of the cutting liquid is equal to a normal atmospheric pressure, i.e., 0.1 Mpa (about one atmospheric pressure). On the other hand, the high-pressure cutting oil S (high-pressure liquid) is pressurized by the high-pressure cutting oil supplying unit (not illustrated) to exceed the atmospheric pressure.

Figure 6:
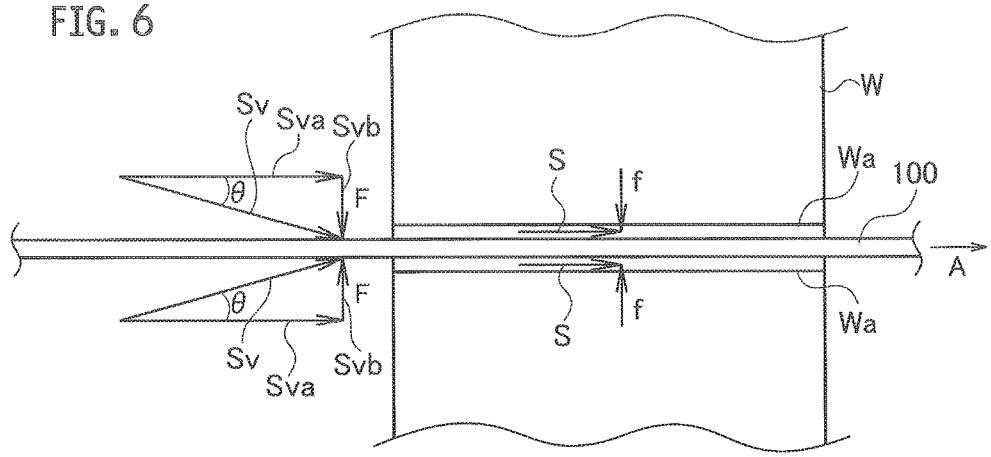
FIG. 6 is a plan diagram for explaining a relation of force between each side of a band saw blade to which high pressure liquid is jetted according to an embodiment of the present invention.

As illustrated in FIG. 6, the pair of nozzles 50 are arranged to inject the high-pressure cutting oil S toward each side face of the body 101 of the band saw blade 100 at an inclination angle θ (theta). At this angle, the high-pressure cutting oil (indicated with a vector Sv) has a collision pressure component Svb in a direction perpendicular to the side face of the body 101, and a pressure component Sva in the running direction A of the band saw blade 100.

Figure 4:
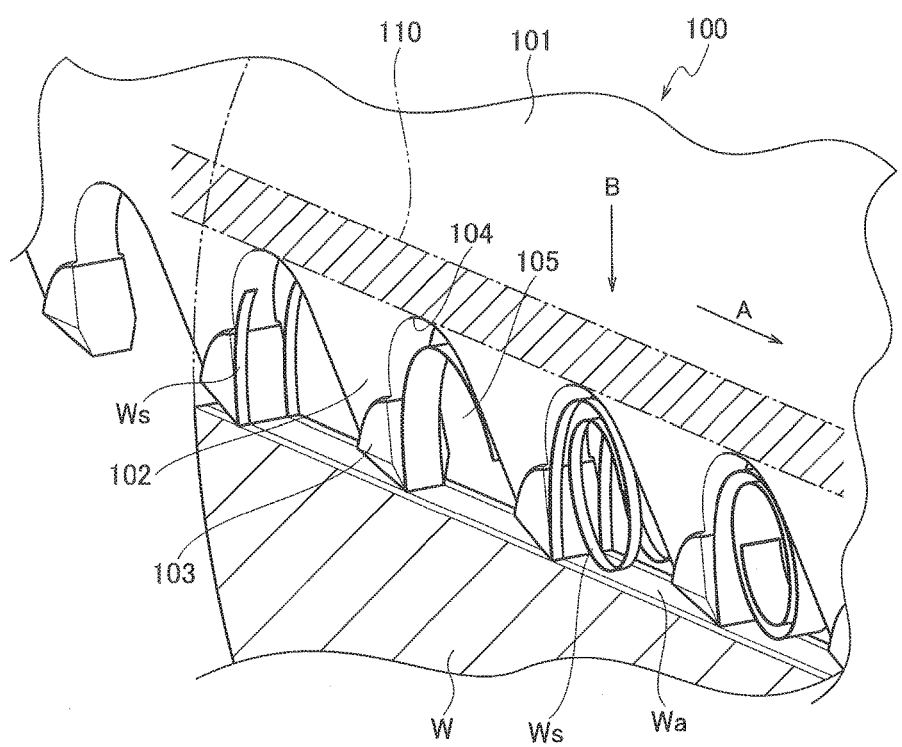
FIG. 4 is a schematic perspective diagram showing an anti-vibration arrangement inside a cut groove according to an embodiment of the present invention.

In this case as illustrated in FIG. 1, it is preferable to arrange the nozzles 50 on the blade insert 25 of the movable blade guide 23 that is on the entering side. As illustrated in FIG. 4, the injection position of the high-pressure liquid from each nozzle 50 is preferably a lower part of the side face of the body 101 of the band saw blade 100.

Figure 5:
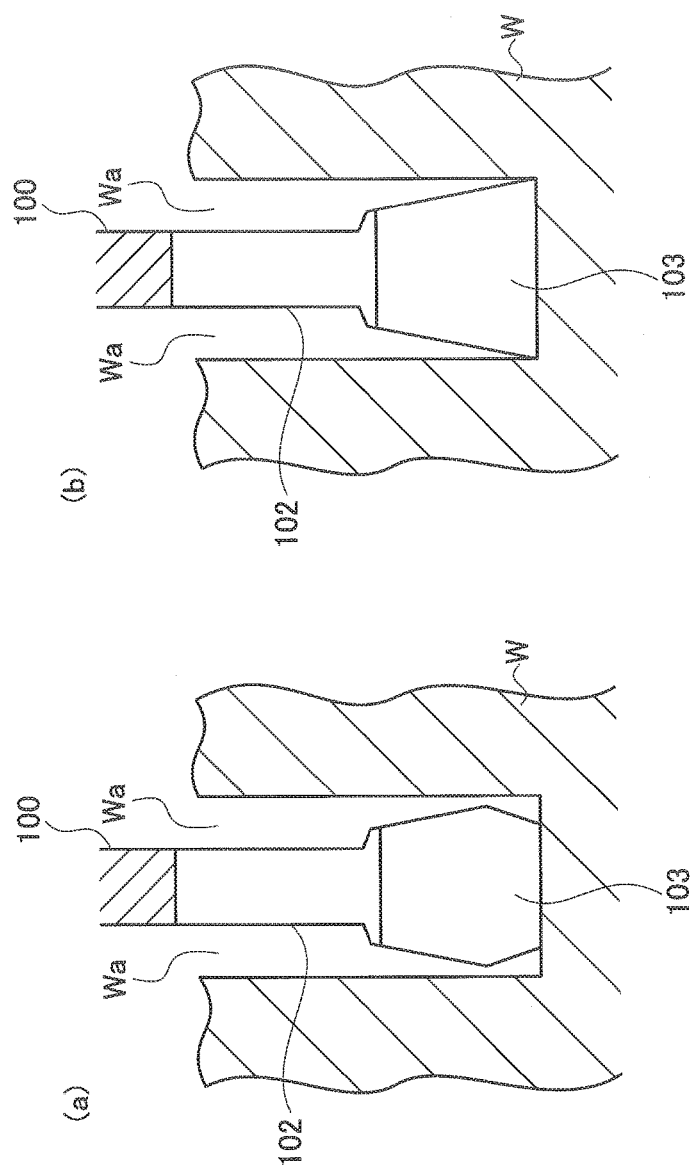
FIG. 5 is a schematic side diagram showing a relation between a cut groove and a band saw blade, (a), (b) are sectional views in a direction perpendicular to the running direction of the band saw blade according to an embodiment of the present invention.

Along a lower edge of the body 101, the band saw blade 100 has many sawteeth 102, each having a carbide tip 103 at the cutting edge. The space between adjacent sawteeth 102 is a gullet 105 to receive chips Ws. FIG. 5 illustrates the relationship between the cut groove and the band saw blade 100.

Toward the bottom of the gullets 105 and the nearby area 110, the high-pressure cutting oil S is jetted. If the cutting oil S is jetted toward positions far from the cutting edges, the vibration damping effect and cooling effect on the band saw blade will fade. If the cutting oil S is jetted toward positions close to the cutting edges, a pressure receiving area will be reduced to decrease the vibration damping effect. It is preferable that each nozzle 50 jets the high-pressure liquid at an inclination angle θ (theta) during which the liquid may keep a continuous state along the side face of the band saw blade 100 up to a downstream side of the workpiece W.

When the high-pressure cutting oil S is jetted in such a way toward each side face of the body 101 of the band saw blade 100, the cutting oil S hits the surface of the body 101, as illustrated in FIG. 6. At this time, a collision force F (=Svb) sandwiches the band saw blade 100 from each side to keep a high-pressure state within gaps between the side faces of the band saw blade 100 and the cut faces of the workpiece W. From each side, the force F damps and restrains vibration of the band saw blade 100 in the blade thickness direction.

When the high-pressure cutting oil S flows into the cut groove Wa, the pressure component Sva in the running direction A at the time of jetting partly remains. In addition, movement of the band saw blade 100 in the cut groove Wa achieves a pressure increasing action (dynamic pressure).

As a result, each side wall of the cut groove Wa produces reactive force to apply a force f to each side face of the body 101 of the band saw blade 100 in a direction orthogonal to the running direction. The force f sandwiches the band saw blade 100 along the whole cutting length thereof, thereby damping and suppressing vibration of the band saw blade 100 in the blade thickness direction.

Next, the forces which work in this case are described.

According to following equation (1), it is possible to calculate a collision force F of the high-pressure cutting oil S orthogonally toward each side face of the body 101 of the band saw blade 100 at the entering side of the cut groove Wa.

$$F = \rho A V^2 \sin \theta \quad (1)$$

In this equation, F: collision force of the liquid orthogonally toward each side face of the body of the band saw blade.
ρ: liquid density
A: pressed area
V: flow velocity According to following equation (2), it is possible to calculate a pressure f applied orthogonally toward each side face of the body 101 inside of the cut groove Wa.

$$f = P A \quad (2)$$

Figure 7:
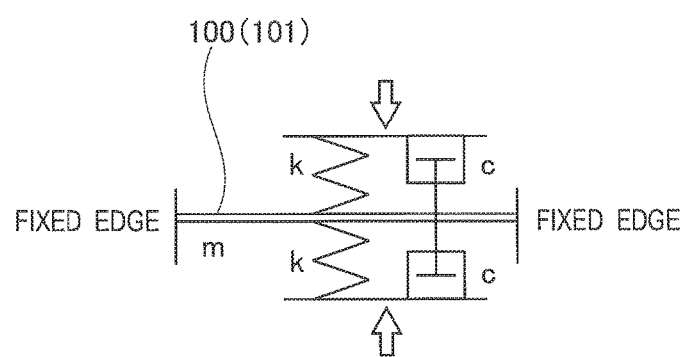
FIG. 7 is a schematic model explaining an anti-vibration arrangement of a band saw blade according to an embodiment of the present invention.

In this equation, f: force orthogonally inside of the cut groove in the blade thickness direction.
P: pressure inside of the cut groove
A: area received pressure A schematic model of a anti-vibration arrangement of a band saw blade 100 as shown in FIG. 7.

This model is such that in order to ensure a vibrate energy of the band saw blade 100 with a spring element k and a damping element c, each side of the band saw blade 100 having mass m is pressed by the force F, f.

As explained above, the vibration suppressing method and arrangement inject the high-pressure cutting oil S toward each side face of the body 101 of the band saw blade 100 on the entering side where the band saw blade 100 enters into the cut groove Wa. At the entering side of the cut groove Wa, the high-pressure cutting oil S applies the collision force F orthogonally to each side face of the body 101 of the band saw blade 100.

In addition, the high-pressure cutting oil S enters into the cut groove Wa that is being cut. In the cut groove Wa, the high-pressure cutting oil S applies the pressure f orthogonally to each side face of the body 101 of the band saw blade 100.

The forces F and f, applied to each side face of the body 101 of the band saw blade 100, suppress vibration of the band saw blade 100 in the blade thickness direction. This results in maintaining productivity, sufficiently suppressing chatter vibration, securing the quality of the cut section of a product, and preventing vibration noise.

These effects are realizable only by arranging the nozzles 50 that jet the high-pressure cutting oil S toward each side face of the body 101 of the band saw blade 100 at the entering side of the cut groove Wa. This arrangement involves no complex structure and is achievable at a low cost. Since the cutting oil is jetted at a high pressure, it achieves both lubrication and cooling to improve cutting performance and vibration suppression of the band saw blade 100.

The injection pressure of the high-pressure cutting oil S is preferably about 1 to 10 Mpa, and more preferably, about 1 to 5 Mpa. The inclination angle θ (theta) of each nozzle 50 with respect to the side face of the band saw blade 100 may optionally be set within the range of 0 to 90 degrees. A preferable value of the inclination angle is about 10 degrees. As an extreme case, the inclination angle may be set to 0 or 90 degrees. If it is set to zero degrees, only the vibration suppressing effect by the pressure f is expected. If the inclination angle is set to 90 degrees, only the vibration suppressing effect by the collision force F is expected.

The number or the diameter of the nozzle 50 is selectable. However, a Φ1. 5 mm diameter of the nozzle 50 is desirable. The number of the nozzle 50 is desirable, two of which are disposed on both sides of the band saw blade 100. The number or location of the nozzle 50 is voluntarily selected.

It is possible to be deferent setting the angles θ of the nozzles to each other. For example, one of the nozzles is disposed vertically to the body 101 of the band saw blade, another is disposed parallel to the body 101 of the band saw blade.

It is possible to inject the high pressure cutting oil S with an angle toward the running direction from upward to downward.

It is also possible to carry out the injection of the high pressure cutting oil S at the leavening side of the band saw blade 100, but also at the entering side on the workpiece.

INDUSTRIAL APPLICABILITY

According to the present invention, it is possible to provide a anti-vibration method and a anti-vibration arrangement for sufficiently restraining vibration of a handsaw blade on a blade thickness direction in a band saw machine without the complex sandwiching structure, while maintaining high productivity.

The invention claimed is:

1. An anti-vibration method of a band saw blade in a band saw machine, which is configured to cut a workpiece by shifting an endless band saw blade running in a circulating manner to a cutting direction, the anti-vibration method comprising:
   providing a blade guide that movably guides the band saw blade and mounting a pair of nozzles on the blade guide, the blade guide being slidable with respect to the workpiece so as to move the nozzles to a position proximate a cut groove of the workpiece and inject a jetted high-pressure liquid into the cut groove at the proximate position; and
   injecting the jetted high-pressure liquid in a range of 1-10 mpa from the nozzles:
   toward each side face of a body of the band saw blade upon an entering-side where the band saw blade enters into the cut groove of the workpiece formed by the band saw blade in a cutting process;
   toward the bottom of gullets, which are defined by spaces between adjacent saw teeth of the body of the band saw blade; and
   toward a nearby area of the body of the band saw blade;
   suppressing vibration of the band saw blade,
   wherein the jetted high-pressure liquid is injected within gaps between the side faces of the band saw blade and cut faces of the workpiece and is introduced into the cut groove of the workpiece during the cutting process,
   the jetted high-pressure liquid hitting the side faces of the band saw blade to provide a collision force that sandwiches the band saw blade so as to suppress vibration of the band saw blade; and
   wherein the nozzles are orientated in a plane that both extends in the cutting direction and also extends in a direction perpendicular to the side faces of the band saw blade, and
   wherein entire outlet openings of the nozzles are positioned below a midpoint of a height of the band saw blade such that the jetted high-pressure liquid is concentrated at a lower end of the band saw blade, the height of the band saw blade being in a direction that is perpendicular to the plane in which the nozzles are oriented.

2. The anti-vibration method of the band saw blade in the band saw machine according to claim 1, wherein the injecting of the jetted high-pressure liquid includes injecting the jetted high-pressure liquid toward each side face of the body of the band saw blade at least at an inclination angle in which the jetted high-pressure liquid has a collision pressure component in a direction perpendicular to the side faces of the body.

3. The anti-vibration method of the band saw blade in the band saw machine according to claim 1, wherein the injecting of the jetted high-pressure liquid includes injecting the jetted high-pressure liquid toward each side face of the body of the band saw blade at least at an inclination angle in which the jetted high-pressure liquid has a pressure component in a running direction of the band saw blade.

4. The anti-vibration method of the band saw blade in the band saw machine according to claim 1, wherein the injecting of the jetted high-pressure liquid includes injecting the jetted high-pressure liquid toward each side face of the body of the band saw blade at an inclination angle in which the jetted high-pressure liquid has collision pressure components in a direction perpendicular to the side faces of the body and in a running direction of the band saw blade.

5. The anti-vibration method of the band saw blade in the band saw machine according to claim 1, wherein the jetted high-pressure liquid is a cutting oil.

6. The anti-vibration method of the band saw blade in the band saw machine according to claim 1, wherein the injecting of the jetted high-pressure liquid includes increasing a pressure of the jetted high-pressure liquid within the cut groove due to circulation of the band saw blade such that side walls of the cut groove exert a reaction force on the side walls of the band saw blade, via the jetted high-pressure liquid, along an entire cutting length of the band saw blade.

7. An anti-vibration arrangement for a band saw blade in a band saw machine, which is configured to cut a workpiece by shifting an endless band saw blade running in a circulating manner to a cutting direction, the anti-vibration arrangement comprising:
   a blade guide that movably guides the band saw blade;
   nozzles mounted on the blade guide, wherein the blade guide is configured to slide with respect to the workpiece so as to move the nozzles to a position proximate a cut groove of the workpiece and inject a jetted high-pressure liquid into the cut groove at the proximate position; and
   the nozzles injecting the jetted high-pressure liquid in a range 1-10 mpa:
   toward each side face of a body of the band saw blade on an entering-side where the band saw blade enters into a cut groove of the workpiece provided by the band saw blade in a cutting process of the band saw machine;
   toward the bottom of gullets, which are defined by spaces between adjacent saw teeth of the body of the band saw blade; and
   toward a nearby area of the body of the band saw blade, wherein the anti-vibration arrangement is configured to suppress vibration of the band saw blade via injection of the jetted high-pressure liquid within gaps between the side faces of the band saw blade and cut faces of the workpiece and into the cut groove of the workpiece during the cutting process,
   the jetted high-pressure liquid hitting the side faces of the band saw blade to provide a collision force that sandwiches the band saw blade so as to suppress vibration of the band saw blade; and wherein
   the nozzles are orientated in a plane that both extends in the cutting direction and also extends in a direction perpendicular to the side faces of the band saw blade, and
   wherein entire outlet openings of the nozzles are positioned below a midpoint of a height of the band saw blade such that the jetted high-pressure liquid is concentrated at a lower end of the band saw blade, the height of the band saw blade being in a direction that is perpendicular to the plane in which the nozzles are oriented.

8. The arrangement for the band saw blade in the band saw machine according to claim 7, wherein the nozzles are arranged such that the jetted high-pressure liquid injects toward each side face of the body of the band saw blade at an inclination angle in which the jetted high-pressure liquid has collision pressure components in a direction perpendicular to the side faces of the body and along a running direction of the band saw blade.

9. The arrangement for the band saw blade in the band saw machine according to claim 7, wherein
the blade guide is configured to movably support a cutting edge of the band saw blade, which is oriented to the workpiece at an entering-side and a leaving-side of the cut groove of the workpiece, and
the nozzles are disposed on the blade guide at the entering side.

10. The arrangement for the band saw blade in the band saw machine according to claim 7, wherein the nozzles are configured to inject the jetted high-pressure liquid such that a pressure of the jetted high-pressure liquid increases within the cut groove due to circulation of the band saw blade and such that side walls of the cut groove exert a reaction force on the side walls of the band saw blade, via the jetted high-pressure liquid, along an entire cutting length of the band saw blade.

11. An anti-vibration method of a band saw blade in a band saw machine, which is configured to cut a workpiece by shifting an endless band saw blade running in a circulating manner to a cutting direction, the anti-vibration method comprising:
injecting a high-pressure liquid in a range of 1-10 mpa from a pair of nozzles:
toward each side face of a body of the band saw blade upon an entering-side where the band saw blade enters into a cut groove of the workpiece formed by the band saw blade in a cutting process;
toward the bottom of gullets, which are defined by spaces between adjacent saw teeth of the body of the band saw blade; and
toward a nearby area of the body of the band saw blade; and
suppressing vibration of the band saw blade, wherein
the high-pressure liquid is injected within gaps between the side faces of the band saw blade and cut faces of the workpiece and is introduced into the cut groove of the workpiece during the cutting process,
the high-pressure liquid hitting the side faces of the band saw blade to provide a collision force that sandwiches the band saw blade so as to suppress vibration of the band saw blade; and wherein
the nozzles are orientated in a plane that both extends in the cutting direction and is oriented also extends in a direction perpendicular to the side faces of the band saw blade, and
wherein entire outlet openings of the nozzles are positioned below a midpoint of a height of the band saw blade such that the high-pressure liquid is concentrated at a lower end of the band saw blade, the height of the band saw blade being in a direction that is perpendicular to the plane in which the nozzles are oriented.

12. The anti-vibration method of the band saw blade in the band saw machine according to claim 11, wherein the injecting of the high-pressure liquid includes injecting the high-pressure liquid toward each side face of the body of the band saw blade at least at an inclination angle in which the high-pressure liquid has a collision pressure component in a direction perpendicular to the side faces of the body.

13. The anti-vibration method of the band saw blade in the band saw machine according to claim 11, wherein the injecting of the high-pressure liquid includes injecting the high-pressure liquid toward each side face of the body of the band saw blade at least at an inclination angle in which the high-pressure liquid has a pressure component in a running direction of the band saw blade.

14. The anti-vibration method of the band saw blade in the band saw machine according to claim 11, wherein the injecting of the high-pressure liquid includes injecting the high-pressure liquid toward each side face of the body of the band saw blade at an inclination angle in which the high-pressure liquid has collision pressure components in a direction perpendicular to the side faces of the body and in a running direction of the band saw blade.

15. The anti-vibration method of the band saw blade in the band saw machine according to claim 11, wherein the high-pressure liquid is a high-pressure cutting oil.

16. The anti-vibration method of the band saw blade in the band saw machine according to claim 11, wherein the injecting of the high-pressure liquid includes increasing a pressure of the high-pressure liquid within the cut groove due to circulation of the band saw blade such that side walls of the cut groove exert a reaction force on the side walls of the band saw blade, via the high-pressure liquid, along an entire cutting length of the band saw blade.

17. An anti-vibration arrangement for a band saw blade in a band saw machine, which is configured to cut a workpiece by shifting an endless band saw blade running in a circulating manner to a cutting direction, the anti-vibration arrangement comprising:
nozzles for injecting a high-pressure liquid:
toward each side face of a body of the band saw blade on an entering-side where the band saw blade enters into a cut groove of the workpiece provided by the band saw blade in a cutting process of the band saw machine;
toward the bottom of gullets, which are defined by spaces between adjacent saw teeth of the body of the band saw blade; and
toward a nearby area of the body of the band saw blade, wherein
the anti-vibration arrangement is configured to suppress vibration of the band saw blade via injection of the high-pressure liquid in a range of 1-10 mpa within gaps between the side faces of the band saw blade and cut faces of the workpiece and into the cut groove of the workpiece during the cutting process,
the high-pressure liquid hitting the side faces of the band saw blade to provide a collision force that sandwiches the band saw blade so as to suppress vibration of the band saw blade; and wherein
the nozzles are orientated in a plane that both extends in the cutting direction and also extends in a direction perpendicular to the side faces of the band saw blade, and
wherein entire outlet openings of the nozzles are positioned below a midpoint of a height of the band saw blade such that the high-pressure liquid is concentrated at a lower end of the band saw blade, the height of the band saw blade being in a direction that is perpendicular to the plane in which the nozzles are oriented.

18. The arrangement for the band saw blade in the band saw machine according to claim 17, wherein the nozzles are arranged such that the high-pressure liquid injects toward each side face of the body of the band saw blade at an inclination angle in which the high-pressure liquid has collision pressure components in a direction perpendicular to the side faces of the body and along a running direction of the band saw blade.

19. The arrangement for the band saw blade in the band saw machine according to claim 17, wherein
- the blade guide is configured to movably support a cutting edge of the band saw blade, which is oriented to the workpiece at an entering-side and a leaving-side of the cut groove of the workpiece, and
- the nozzles are disposed on the blade guide at the entering side.

20. The arrangement for the band saw blade in the band saw machine according to claim 17, wherein the nozzles are configured to inject the high-pressure liquid so as to hit the side faces of the band saw blade and to provide a collision force that sandwiches the band saw blade.

21. The arrangement for the band saw blade in the band saw machine according to claim 17, wherein the nozzles are configured to inject the high-pressure liquid such that a pressure of the high-pressure liquid increases within the cut groove due to circulation of the band saw blade and such that side walls of the cut groove exert a reaction force on the side walls of the band saw blade, via the high-pressure liquid, along an entire cutting length of the band saw blade.

* * * * *